United States Patent [19]
Arnold

[11] 4,045,054
[45] Aug. 30, 1977

[54] APPARATUS FOR RIGIDLY INTERCONNECTING MISALIGNED PIPE ENDS

[75] Inventor: James F. Arnold, Houston, Tex.

[73] Assignee: HydroTech International, Inc., Houston, Tex.

[21] Appl. No.: 558,427

[22] Filed: Mar. 14, 1975

Related U.S. Application Data

[63] Continuation-in-part of Ser. No. 290,953, Sept. 28, 1972, Pat. No. 3,874,706, which is a continuation-in-part of Ser. No. 189,686, Oct. 15, 1971, abandoned.

[51] Int. Cl.² .............................................. F16L 35/00
[52] U.S. Cl. ........................................ 285/18; 285/96; 285/184; 285/261; 285/308; 285/321
[58] Field of Search ................... 285/18, 96, 106, 261, 285/184, DIG. 21, 308, 321, 263, 270, 166, 167, 262, 264-269, 271, 351, 315-317

[56] References Cited

U.S. PATENT DOCUMENTS

| | | | |
|---|---|---|---|
| 1,898,623 | 2/1933 | Gammeter | 285/96 |
| 3,433,504 | 3/1964 | Hanes | 285/321 X |
| 3,638,973 | 2/1972 | Poletti | 285/184 |
| 3,695,633 | 10/1972 | Hanes | 285/18 |

*Primary Examiner*—Dave W. Arola

[57] ABSTRACT

An apparatus for rigidly interconnecting the ends of two pipes, such as two pipes whose axes are misaligned. It includes a pair of coupling members, each of which is adapted for connection at one end thereof to one of the pipes which are to be interconnected. One of the coupling members has attached thereto an annular radially outwardly enlarged portion having forward and rearward sides, with the forward sides being generally spherical shaped. The other coupling member has attached thereto a housing having a seat portion adapted for receiving the forward side of the enlarged portion in generally mating engagement therewith, to thereby accommodate axial misalignment between said coupling members. Gripping means, such as a plurality of slips or a split ring, are supported generally between the housing and the enlarged portion. The gripping means are adapted for radial and axial movement relative to the housing seat portion between a retracted position in which the enlarged portion is freely received into the housing and mateable with the housing seat portion and a set position engaging the rearward sides of the enlarged portion and holding the same in positive contact with the housing portion, to thereby provide a rigid interconnection of the two coupling members. Setting means are provided for effecting relative axial and radial movement between the gripping means and the housing seat portion to thereby place the gripping means in the set position and for holding the coupling members rigidly interconnected as stated above. Accordingly, there is provided a coupling member which is arranged for connecting two misaligned pipe ends and which coupling members, when actuated, can provide a rigid connection therebetween which prevents both axial separation and axial flexing movement.

19 Claims, 9 Drawing Figures

APPARATUS FOR RIGIDLY INTERCONNECTING MISALIGNED PIPE ENDS

CROSS REFERENCE TO RELATED APPLICATIONS

This application is a continuation-in-part of corresponding U.S. application Ser. No. 290,953, filed Sept. 28, 1972, entitled FLUID ACTUATED PIPE CONNECTION AND METHOD, by the same applicant herein, now U.S. Pat. No. 3,874,706, and which application was a continuation-in-part of corresponding application U.S. application Ser. No. 189,686 filed Oct. 15, 1971, entitled BALL AND SOCKET PIPE CONNECTION AND METHOD, by the same applicant, which latter application is now abandoned.

BACKGROUND OF THE INVENTION a. Field of the Invention

This invention relates to apparatus for rigidly interconnecting the ends of two pipes such as two pipes that might be positioned in an underwater environment in which the pipe ends are axially misaligned.

More particularly, this invention relates to an apparatus for rigidly interconnecting the ends of two such pipes in a difficult working environment and which rigid interconnection can be accomplished by the use of the apparatus of this invention without the necessity for performing a welding operation in the difficult working environment, yet which also provides a rigid coupling which will withstand wave action and the like thereagainst.

b. Description of the Prior Art

There are many examples in the prior art of couplings which are arranged for interconnecting pipes whose axes are misaligned. These generally are in the form of what is commonly referred to as ball and socket couplings. However, such ball and socket couplings are usually of the dynamic type which are arranged to provide for continued flexing movement between the axes of the two pipes which are joined after the couplings are connected. However, such flexing movement is very undesirable in certain environments such as underwater where the couplings are subject to wave action when such conduits are subjected to high pressure fluids passing therethrough. Continued flexing of motion caused by such wave action puts a severe stress upon such couplings, particularly those adapted for the transmission of high pressure fluid. As a consequence of such continued flexing actions, such couplings have in the past been subjected to early failure and have therefore been generally considered as unsatisfactory.

SUMMARY OF THE INVENTION

It is, therefore, an object of this invention to provide a coupling apparatus which is arranged for interconnecting two misaligned pipes or stated otherwise, to accommodate pipe end misalignment and which can effect a rigid interconnection of the two pipes in a difficult working environment, as for example, in a subsea location.

More particularly, this invention relates to an apparatus for rigidly interconnecting the ends of two pipes and comprises a pair of coupling members, each of which is adapted for connection at one end thereof to the end of one of the pipes to be interconnected. One of the coupling members has attached to the other end thereof an annular radially outwardly enlarged portion having forward and rearward sides, with the forward side being generally spherical shaped. The other coupling member has attached thereto a housing having a seat portion adapted for receiving the forward side of the enlarged portion in generally mating engagement therewith, to thereby accommodate axial misalignment between the coupling members. Gripping means are provided which are supported generally between the housing and the enlarged portion. The gripping means are adapted for both radial and axial movement relative to the housing seat portion between a retracted position in which the enlarged portion is freely mateable with the housing seat portion and a set position engaging the rearward side of the enlarged portion and urging the enlarged portion into positive contact with the housing seat portion and holding the enlarged portion and the housing rigidly interconnected.

Setting means are also provided for effecting relative axial and radial movement between the gripping means and the housing seat portion to thereby place the gripping means in the set position and for holding the coupling members rigidly interconnected. Preferably, the housing has supported therein means for forming an axially and radially inwardly tapered cam surface spaced from the enlarged portion. The gripping means may be in the form of gripping apparatus supported generally radially inwardly of the cam surface and arranged for camming engagement therewith during movement to the set position. This cam surface is generally frusto-conical in shape, with the small end thereof facing in the direction away from the seat portion or, stated otherwise, with the tapered surface facing toward the seat portion. Preferably, the degree of taper between the cam surface and the longitudinal axis of the other coupling member is between about 30° and 60° at the minor angle, to provide the desired wedging action of the gripping apparatus.

BRIEF DESCRIPTION OF THE DRAWINGS

Referring now to FIGS. 1-3, one preferred embodiment of the invention will be described. There it will be seen that a first coupling member generally designated by the numeral 11 is shown attached to a pipe 12 as by welding or the like and includes a radially enlarged housing 13 having a full opening bore on the right end thereof as shown in FIG. 1 for freely receiving thereinto a portion of another coupling member designated by the numeral 15. Coupling 15 includes an enlarged portion 16 generally spherical shaped, at least on the forward exterior surface thereof, for purposes which will be described hereinafter. Coupling member 15 is shown attached as by welding to another pipe 17 whose axis is shown as generally being misaligned with the axis of pipe 12. The internal bore of coupling member 15 is shown flared radially outwardly toward the forward end thereof so as to receive thereinto sleeve 18 which is attached by welding or the like to housing 13 in coaxial alignment therewith. Sleeve 18 is arranged to reduce turbulence of fluid passing through the coupling and to prevent hangups of any pipeline pigs that may be passed through the pipes. Housing 13 has formed therewith a portion forming seating surface 19 which is arranged for mating engagement with the spherical-shaped forward surface of enlarged portion 16 of coupling member 15. Thus, it will be observed that the coupling apparatus of this invention is arranged to interconnect pipe, such as pipes 12 and 17, whose axes are misaligned to a substantial extent, as for example, on the order of 15°. Moreover, sealing surface 19 is shown as having an axial recess therein in which is received a seal such as O ring seal 20 for effecting a fluid tight seal between the external surface of enlarged portion 16 and housing 13.

Figure 1:
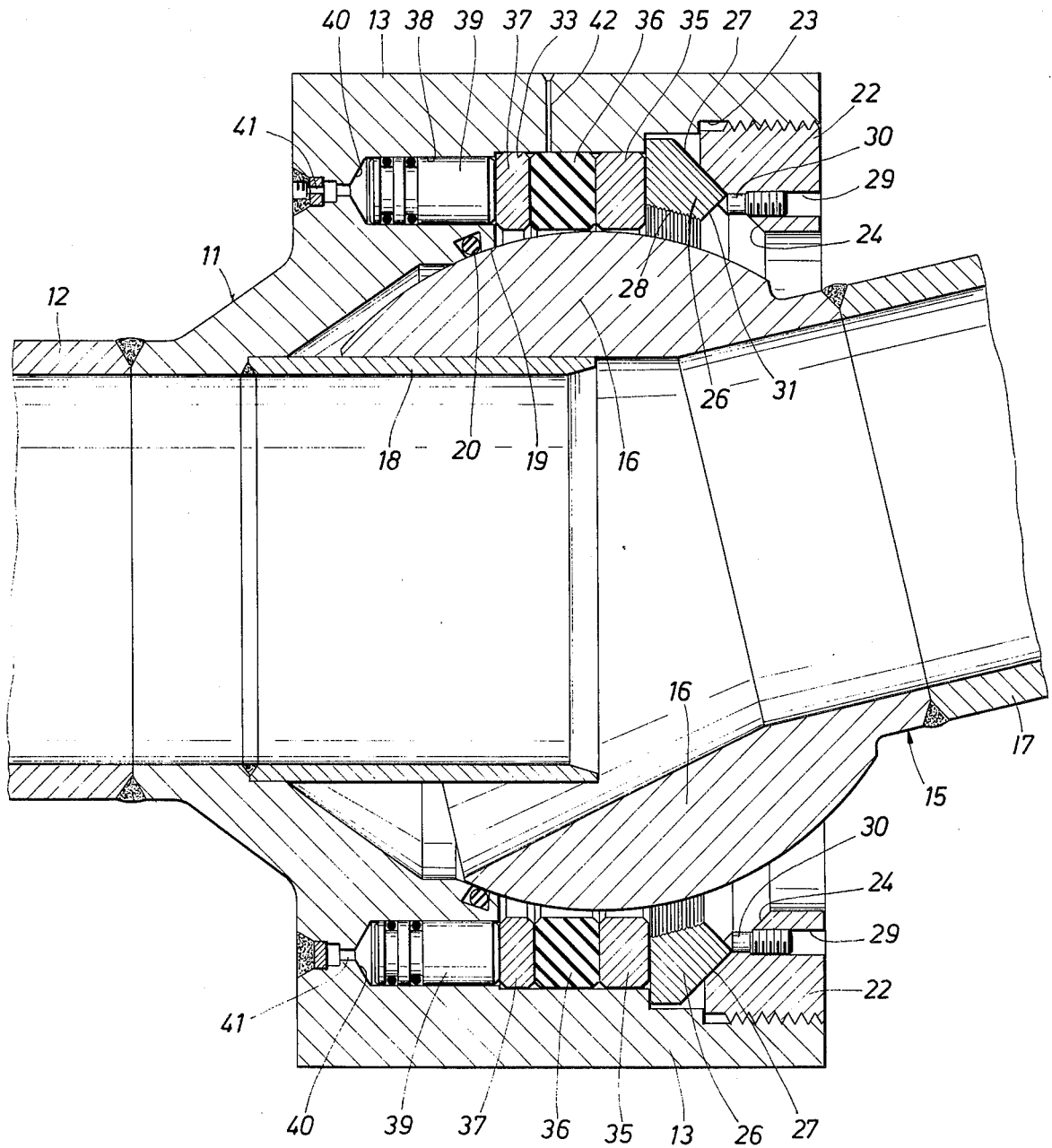
FIG. 1 is a central longitudinal sectional view of one preferred form of the apparatus of this invention showing the same in the position just prior to the final actuation step.

Housing 13 is also provided with a portion forming an inclined ramp or surface which is tapered generally axially and radially away from seating surface 19. Stated otherwise, housing 13 has a portion forming an axially and radially tapered surface which faces generally toward seating surface 19. This portion includes a retaining ring 22 threadably mounted in the annular internal threaded bore 23 of housing 13. Ring 22 is provided with a frusto-conical shaped tapered surface 24 which provides a camming surface for the gripping means or gripping assembly to be described hereinafter.

Figure 2:
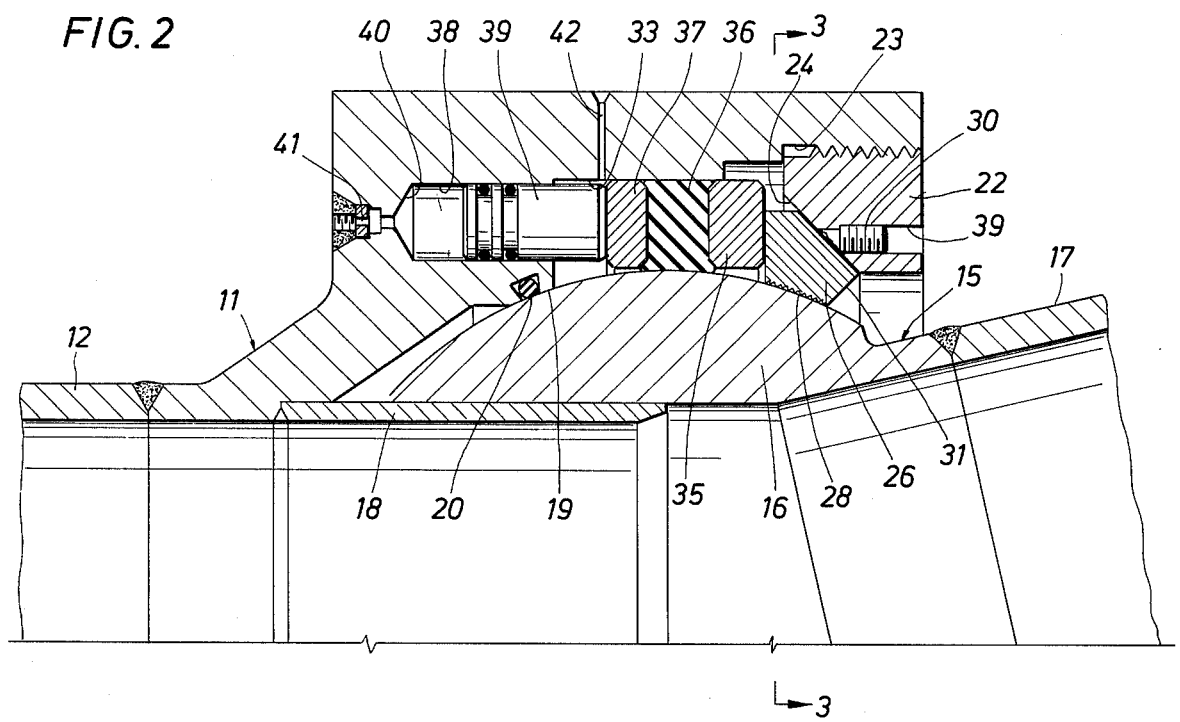
FIG. 2 is a partial sectional view similar to FIG. 1, but showing the coupling members actuated to the set or locked position.
Figure 3:
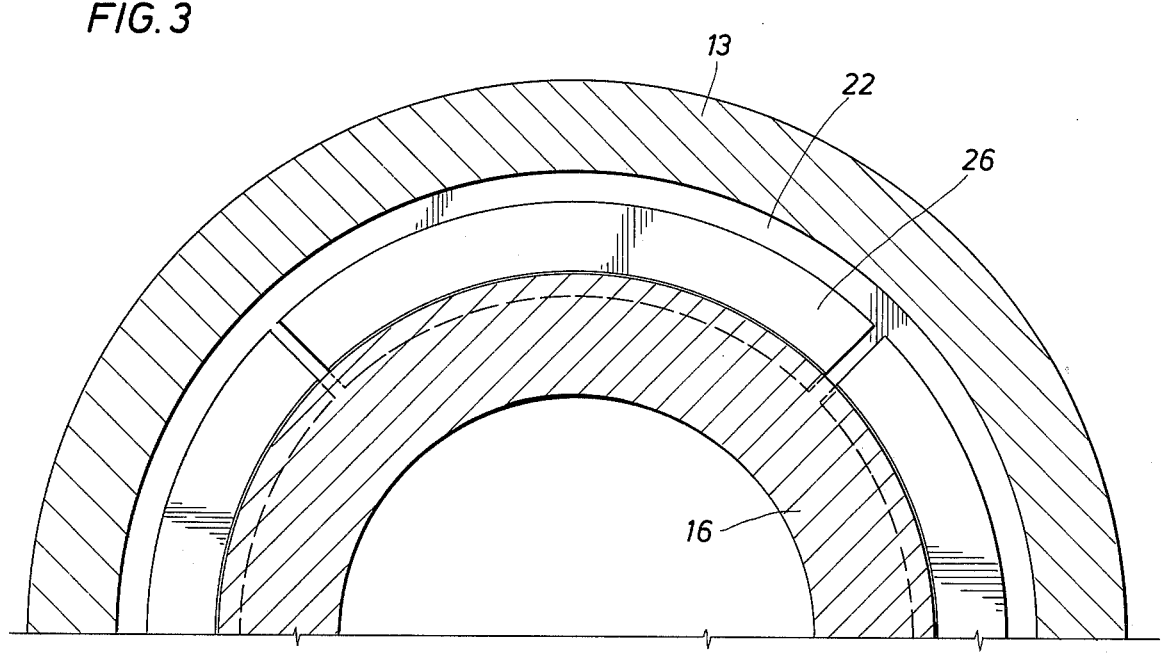
FIG. 3 is a sectional view generally taken along line 3—3 of FIG. 2.

These gripping means in the embodiment shown in FIGS. 1-3 are in the form of a plurality of segmented (as for example four) slips 26 mounted generally radially adjacent tapered surface 24 and having a mating radially outward surface 27 arranged for camming engagement with tapered surface 24 when moved to the set position, as will be described hereinafter. Slips 26, as shown, are generally arcuate shaped and together extend around substantially the full internal circumference of housing 13 and the external circumference of enlarged portion 16 of coupling member 15. The radially inward sides of slips 26 are provided with a roughened locking surface as, for example, gripping teeth 28, so as to frictionally engage and rigidly hold enlarged portions 16 upon actuation to the set position. It will be noted that the angle of the taper of tapered surface 24 is approximately 45°, with respect to the central axis of coupling member 11 at the minor angle. Preferably, the degree of taper is in the range of 30°-60°, and in any event is greater than the angle formed by a tangent with the rearward side of enlarged portion 14 at the area of engagement of slips 26 therewith, to thereby cause wedging of slips 26 against enlarged portion 16. Accordingly, upon movement of slips 26 from the retracted position shown in FIG. 1 to the set position shown in FIG. 2, the same are cammed radially into wedging engagement with the rearward side of enlarged portion 16, as shown in FIG. 2.

Slips 26 are held in the retracted position such that housing 13 will freely receive enlarged portion 16 thereinto. Hence, retaining ring 22 is provided with a plurality of generally axially extending threaded bores 29, each of which has threadably mounted therein a teflon shear pin 30 adapted to have the forward ends abut against the nose surface 31 of each of the slips 26 and retain the same in the retracted position shown in FIG. 1. Upon actuation of slips 26 to the set position, as will be described hereinafter, shear pins 30 are readily sheared without otherwise disturbing the setting operation.

This embodiment also includes setting means for effecting relative axial and radial movement between the aforesaid gripping means and the housing seat surface 19, to thereby place the gripping means in the set position and for holding the coupling members 11 and 15 in rigid interconnection. Housing 13, in the embodiment being described, is provided with a somewhat radially reduced internal bore designated by the numeral 33 in which has mounted therein an annular nondeformable thrust ring 35 which is arranged for abutment on the outward side against the rearward ends of slips 26, as shown in FIGS. 1 and 2. Thrust ring 35 abuts at the other axial end against an annular elastomeric deformable member 36, which in turn abuts against another nondeformable annular thrust ring 37.

Piston means are provided for actuating the tool to the set position, and this conveniently takes the form of a plurality of circumferentially spaced generally axially aligned cylinders 38 formed in housing 13 and in each of which is mounted a generally axially movable piston 39 having appropriate annular seals thereabout to form a fluid type chamber 40 on the rearward axial end thereof. The other axial ends of pistons 39 are arranged for abutment against and application of thrust forces to thrust ring 37, elastomeric member 36, thrust ring 35 and, hence, slips 26.

Housing 13 is provided with means for applying hydraulic fluid pressure to chambers 40 which conveniently takes the form of a plurality of appropriately valved axially extending ports 41 which are arranged for connection to a convenient source of hydraulic fluid pressure. Such hydraulic fluid may be in the form of a liquid epoxy resin which, upon setting after the coupling apparatus has been moved to the set position, will cause the same to be permanently joined together. In addition, housing 13 may be provided with one or more generally radially extending and appropriately valved ports 42 communicating with the chamber formed inside of bore 33 and which ports may be used to apply a test pressure to determine whether or not the coupling members are properly joined after the same are moved to the set position.

In operation, coupling members 11 and 12 are initially assembled in the condition shown in FIG. 1, with slips 26 held radially retracted by shear pins 30. Pistons 39 are axially retracted such that elastomeric member 36 is in the relaxed or nondeformed condition. Thereafter, pressurized fluid such as hydraulic fluid or liquid epoxy resin is applied through ports 41 to chambers 40. Continued application of such pressure causes pistons 39 to move axially forward thereby applying axial forces to thrust ring 37 which thereby axially compresses and radially deforms elastomeric member 36 into sealing contact between housing 13 and the enlarged portion 16 as shown in FIG. 2. Continued application of fluid pressure in turn causes axial forces to be applied to thrust ring 35 which in turn forces slips 36 axially to the right as shown in FIGS. 1 and 2, and radially inward. The result is that external surfaces 27 of slips 26 are caused to engage with and be cammed along cam surface 24 to the set position. Stated otherwise, slips 26 are thereby cammed both radially inwardly and axially to wedging and gripping engagement with the rearward side of enlarged portion 16 as shown in FIG. 2. The amount of fluid pressure applied to chambers 20 is selected such as to cause slips 26 and gripping teeth 28 thereof to grip enlarged portion 16 with such force that enlarged portion 16 is urged into positive engagement with seating surface 19 thereby forming a seal therebetween. In addition, the application of fluid to chambers 40 is continued to the extent that slips 26 engage and hold enlarged portion 16 with sufficient force so as to prevent both relative axial movement between coupling members 11 and 15. In such condition, elastomeric member 36 is further deformed so as to store energy therein, thereby providing a continuing biasing force urging slips 26 to the set position. In order for elastomeric member 36 to perform its function of transmitting axial forces of the magnitude contemplated, it must be relatively hard, as for example, a hardness of about 80 on the Durometer scale. In the event that there is any subsequent wear of slips 26, they will nevertheless be continuously urged to the set and locking position heretofore described. After completion of the actuation of slips 26 to the set position as heretofore described, fluid pressure can thereafter be applied through ports 42 to determine whether or not an effective seal has been made between a seal 20 and elastomeric members 33, which acts as another seal when in the deformed position as shown in FIG. 2. If, for example, it is determined that fluid pressure is lost when pressure is applied through ports 42, then the matter can be investigated and the tools disconnected prior to permanent installation and the default corrected.

This embodiment provides a coupling apparatus which is arranged to rigidly interconnect two pieces of pipe which can be actuated by a single source of fluid pressure and which actuation can effect both the gripping and the sealing operation as described above.

It should be understood that coupling members 11 and 15 may be attached to pipe subs which, in turn, have connected thereto other means as, for example, overfitting hydraulically actuated couplings, for connection to the pipes which are to be joined and which pipes nevertheless are misaligned. This latter arrangement would be employed in those instances where the pipes which are to be joined cannot be welded to the aforesaid coupling members because the same are not readily removable to a suitable welding environment. In the embodiment described above, housing 11 is normally welded to pipe 12 and housing 15 is welded to pipe 17 in a suitable welding environment and thereafter the same are moved to the subsea location for the joining operation described.

Figure 4:
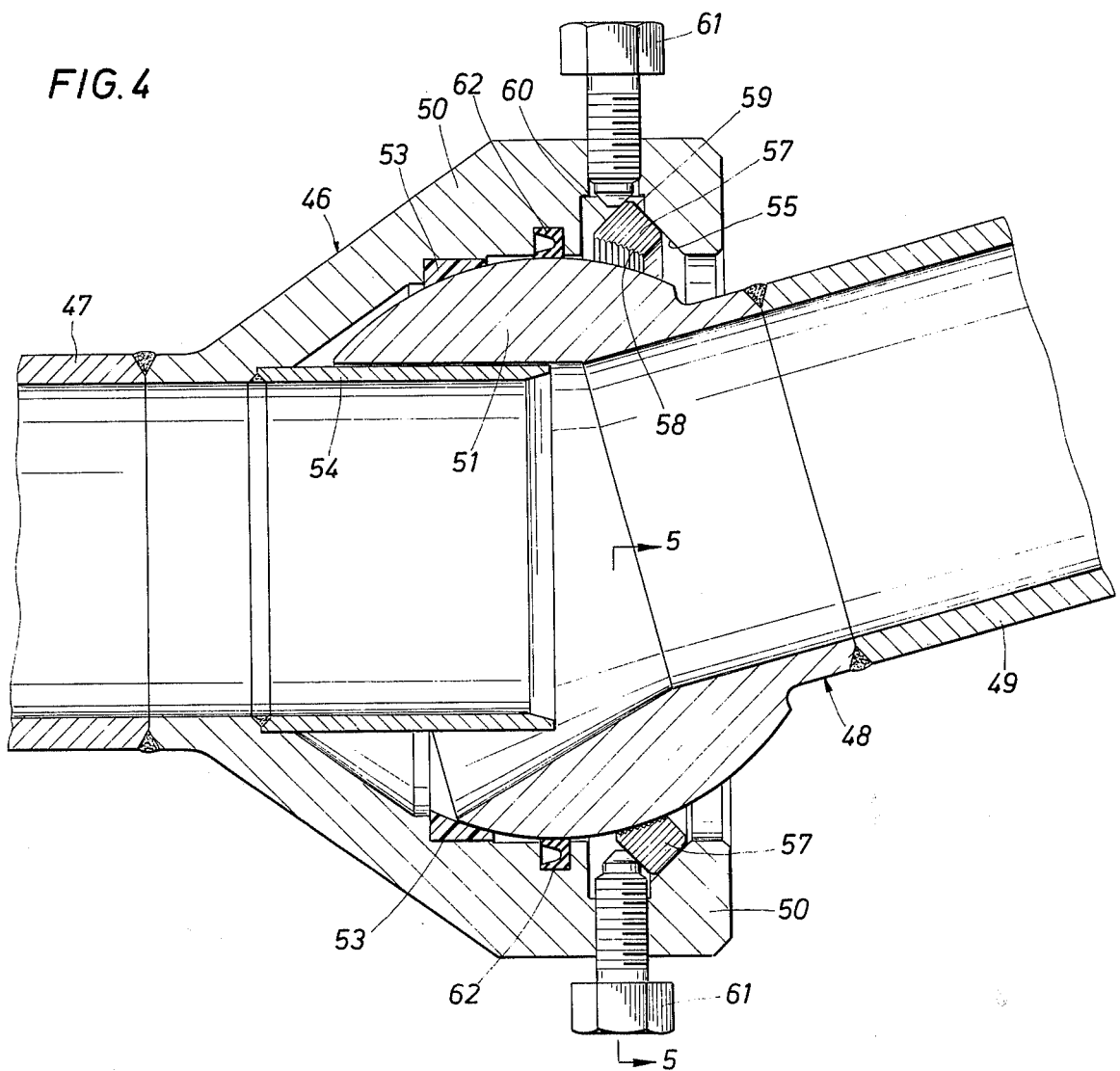
FIG. 4 is a central sectional view of an alternate preferred embodiment in which the top half thereof is shown immediately prior to actuation to the set position and the lower half thereof is shown actuated to the set or locking position.
Figure 5:
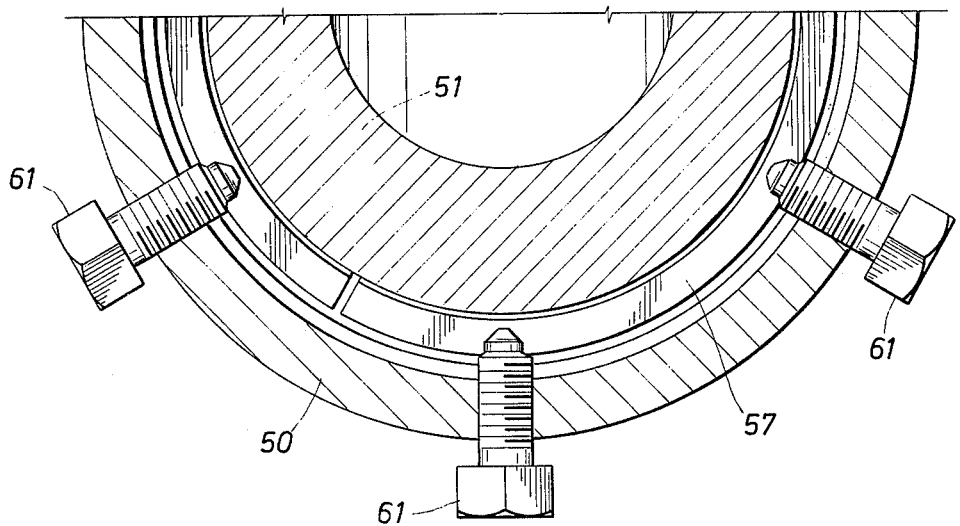
FIG. 5 is a sectional view taken generally along line 5—5 of FIG. 4.

Referring now to FIGS. 4 and 5, an alternate embodiment will be described which is generally similar with the prior embodiment, but has somewhat different gripping means and setting means. In this embodiment, coupling member 46 is shown attached as by welding or the like to pipe 47. Further, coupling member 48 is shown attached as by welding or the like to pipe 49. As explained with the preceding embodiment, in the event that it is not possible to move pipes 47 and 49 to a suitable welding environment or if the same are initially positioned in an underwater location where such welding is not possible, then coupling members 46 and 48 would be attached to suitable subs which in turn would be attached to appropriate overfitting hydraulic couplings or the like as described above. Coupling member 46 includes a housing 50 having an axial bore of sufficient size for enlarged ball portion 51 of coupling member 48 to be freely received thereinto. Coupling member 48 is in all respects similar to coupling members 15, and enlarged portion 51 thereof has a spherical-shaped forward side which is arranged for mating engagement with annular metal seat 53 mounted at the rearward end of the bore formed in housing 50 as shown in FIG. 4. The internal surface of seat 53 is generally mateable with the spherical surface of the forward side of enlarged portion 51. Housing 50 is also provided with an axially extending sleeve 54, which is similar to sleeve 18 of the prior embodiment.

Housing 50 also has a forward portion forming cam surface 55 which is generally similar to cam surface 24 of the prior embodiment. Cam surface 55 is shown tapered at an angle of about 45° with the longitudinal central axis of coupling member 46 and has supported radially adjacent thereto gripping means in the form of annular split ring 57. In this instance, the gripping means is comprised of a single element. For the purpose of this application, split ring 57 may sometimes be referred to as the gripping apparatus or the gripping assembly. Split ring 57 has provided on the radially inward side thereof a generally spherical-shaped surface having gripping teeth 58 formed therein for frictionally engaging the rearward side of enlarged portion 51. The radially outward side of split ring 51 includes a forward frusto-conical shaped cam surface 59, which is arranged for mating and camming engagement with cam surface 55. In addition, ring 57 has a rearward frusto-conical shaped surface 60 which faces generally rearwardly and which is arranged for camming engagement by a plurality of threaded elements in the form of setting bolts 61, which are threadably engaged in housing 50 as shown. As bolts 61 are turned or threaded into housing 50, they move radially inward, thereby causing split ring 57 to be cammed radially and axially along cam surface 55 of housing 50 to the set position as shown in the lower half of FIG. 4.

This embodiment is also provided with seal means, as for example, V-shaped seal 62 which is mounted in an appropriate radially inwardly facing channel formed in the internal bore of housing 50. Seal 50 is arranged to have increased sealing as a result of any line pressure which escapes past seat 53.

In the operation, coupling members 46 and 48 are initially positioned as shown in the top half of FIG. 4. Split ring 57 is formed with a sufficiently large diameter that, in the initial position, enlarged portion 51 freely passes therethrough. Thereafter, setting bolts 61 are manually threaded into housing 50 to the set position shown in the lower half of FIG. 4. Split ring 57 is thereby cammed axially and radially to the gripping and wedging position shown in the lower half of FIG. 4. By turning on bolts 61 with sufficient force, split ring 57 is caused to be cammed into sufficient frictional engagement with enlarged portion 51 so as to effect a rigid interconnection of coupling members 46 and 48 which will withstand both relative axial and flexing movement therebetween.

This embodiment provides a tool which can effect a rigid connection between two misaligned pipes and which can be easily manipulated to the set position as heretofore described. Because of the unique structure of the tool, the gripping apparatus is arranged for radial and axial movement to a wedging position such that coupling members 46 and 48 are held in the aforesaid fixed position upon actuation thereof.

Figure 6:
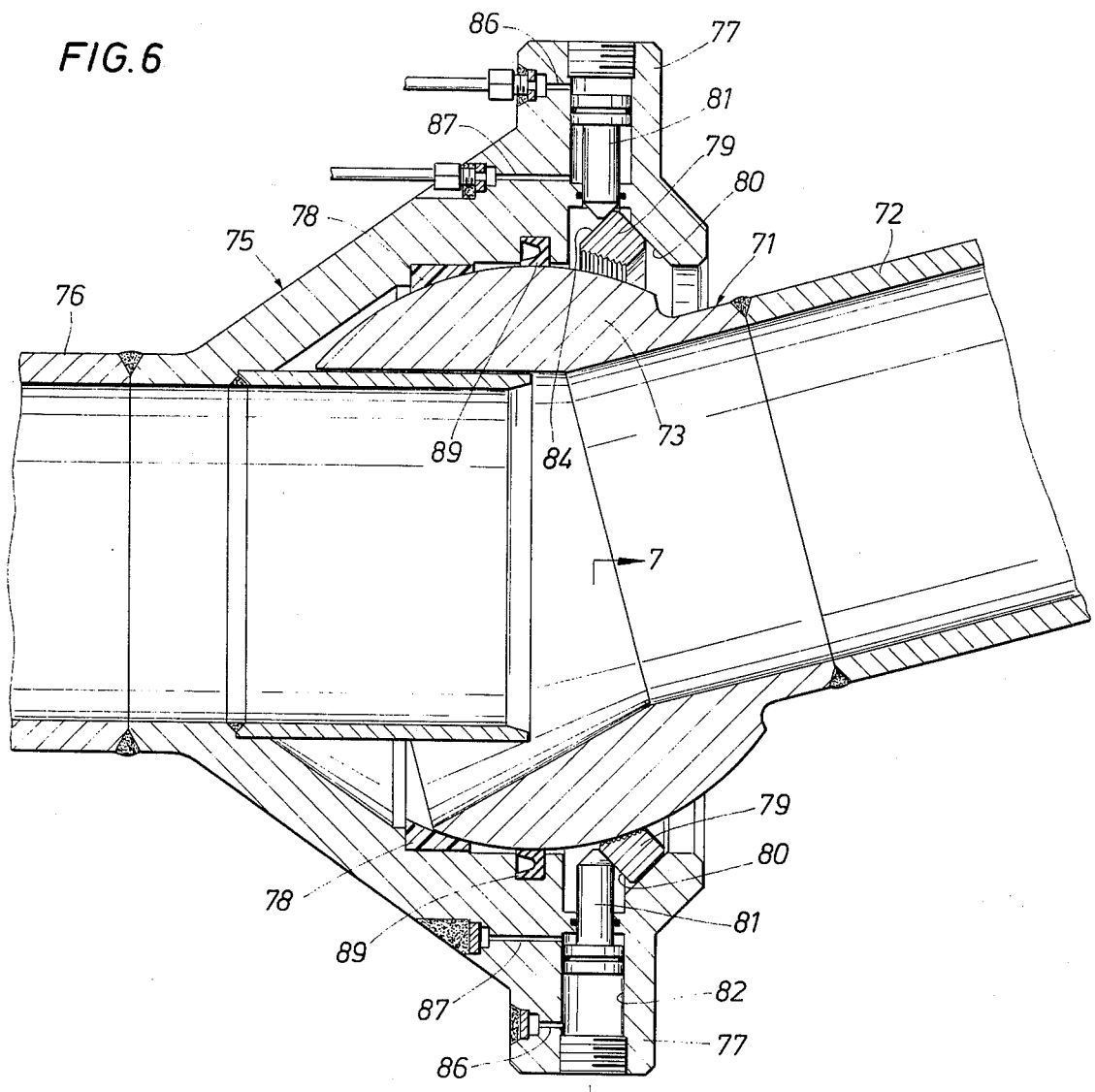
FIG. 6 is another central sectional view of another alternate embodiment generally similar to the FIG. 4 embodiment and showing the upper half of the apparatus in the position immediately prior to setting and the lower half showing the tool in the set position.
Figure 7:
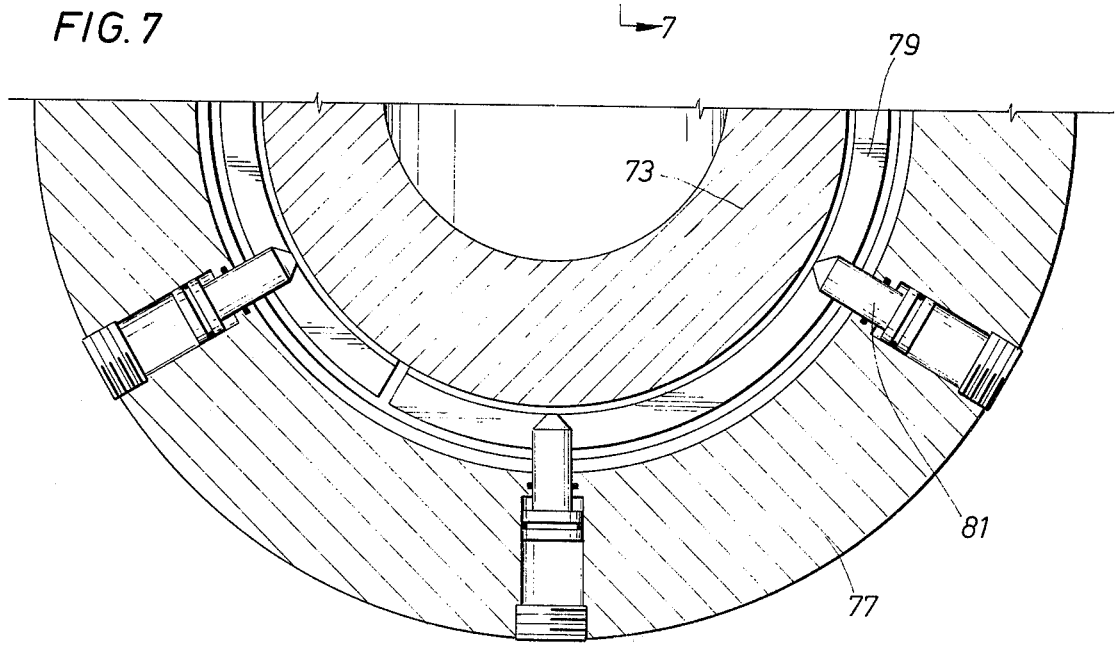
FIG. 7 is a sectional view taken generally along line 7—7 of FIG. 6.

Referring now to FIGS. 6 and 7, a further embodiment will be described which is generally similar to the FIGS. 4-5 embodiment, but which is provided with hydraulic actuation means. In this embodiment, coupling member 71 (which is identical with coupling member 48 of the prior embodiments) is shown attached to pipe 72 and has attached at the other end thereof an enlarged portion designated by the numeral 73, which enlarged portion has axially forward and axially rearward sides, as with the previous embodiments.

Coupling member 75 is shown attached to pipe 76 and is provided with housing 77 having an axial bore of sufficient size for freely receiving thereinto enlarged portion 73. Housing 77 has mounted therein annular metal seat 78, which is identical with seat 53 of the prior embodiment and which is arranged for mating engagement with the spherical-shaped forward side of enlarged portion 73 so as to accommodate axial misalignment between coupling members 71 and 75, as with the previous embodiments. Housing 77 has a forward portion which forms a frusto-conical shaped cam surface 80 which is similar to cam surface 55 of the prior embodiment. Cam surface 80 has mounted radially adjacent therewith gripping apparatus in the form of split ring 79 which is identical with split ring 57 of the prior embodiment and is arranged for camming engagement with and axially radial movement along cam surface 80 upon movement to the set position of engagement with the rearward side of enlarged portion 73.

In this embodiment, hydraulic piston means are provided as the setting means and take the form of a plurality of generally radially movable pistons 81 mounted in a plurality of generally radially extending cylinders 82 formed in housing 77. The radially inward ends of pistons 81 are cone shaped and arranged for camming engagement with the rearward frusto-conical shaped surface 84 of split ring 79. Upon application of pressurized fluid through appropriately valved ports 86, pistons 81 are caused to move radially inward, thereby camming split ring 79 to the set position along cam surface 80. It is to be understood that during such movement of pistons 81, pressure is relieved through appropriately valved ports 87 provided in housing 77. In the event it is desired to move pistons 81 to the unseated position, then pressure is applied through ports 87 and relieved through ports 86.

This embodiment is also provided with an annular seal 89 which is identical with seal 62 of the previous embodiment and similarly positioned within the housing 77 and in relation to enlarged portion 73.

In operation, the apparatus of this embodiment is initially assembled in the condition shown in the upper half of FIG. 6. Split ring 79 is in the unactuated position such that enlarged portion 73 is freely received within housing 77 such that the forward side of enlarged portion 73 can freely mate with valve seat 78. Thereafter, fluid pressure is applied through valve ports 86 to cause pistons 81 to move radially inward thereby camming split ring 79 axially and radially along cam surface 80 to the set position shown in the lower half of FIG. 6. The application of such fluid pressure is of sufficient magnitude to cause split ring 79 to frictionally engage the rearward surface of enlarged portion 73 with sufficient force to rigidly interconnect coupling members 71 and 75, as with the previous embodiments, and hold the same against relative axial and flexing movement therebetween. During such movement to the set position, the forward side of enlarged portion 73 is urged into sealing engagement with seat 78, causing seal 89 to effect sealing therebetween. As with the previous embodiments, the setting fluid may be in the form of epoxy resin which, upon setting, provides a permanent coupling.

Figure 8:
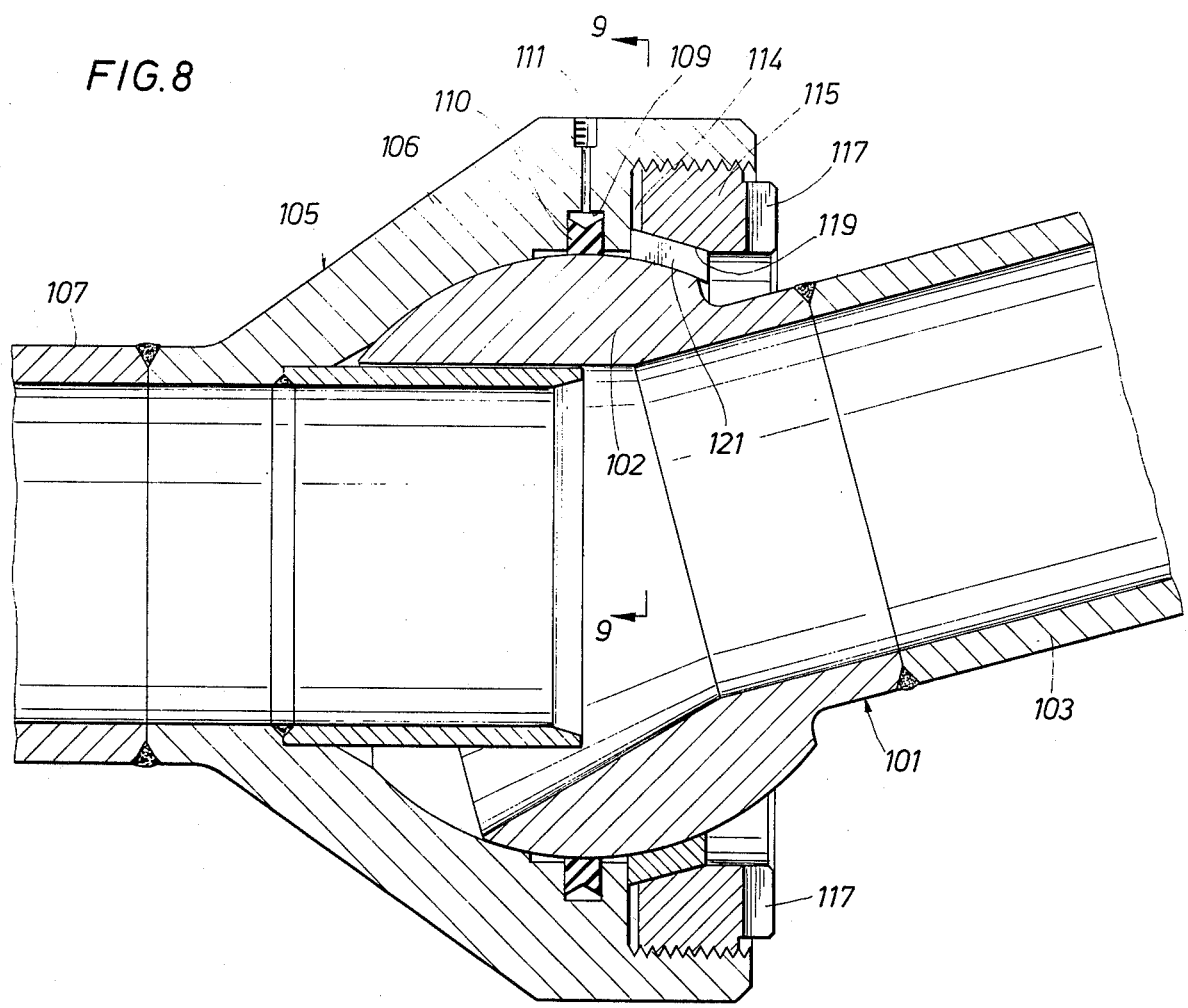
FIG. 8 is a central longitudinal sectional view of another alternate embodiment of the invention.
Figure 9:
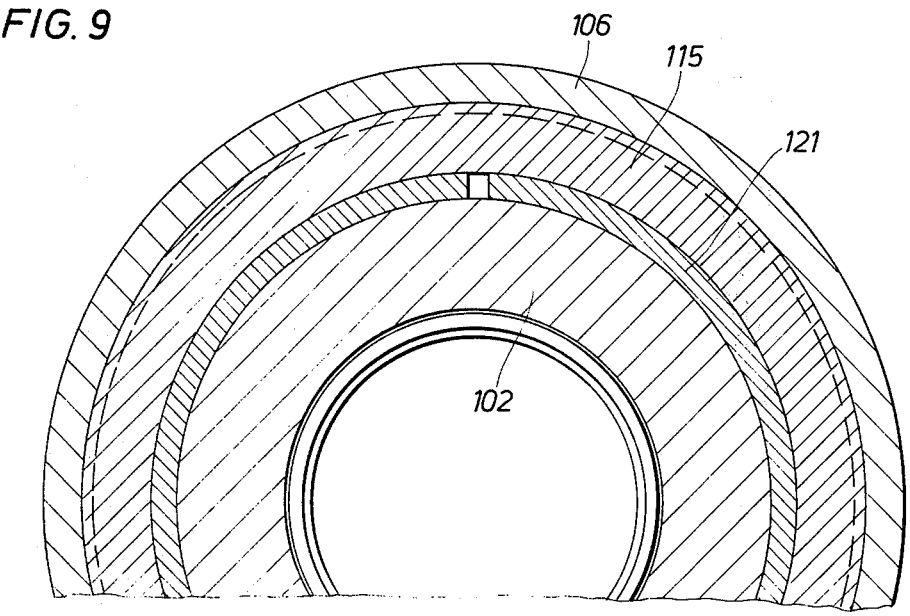
FIG. 9 is a partial sectional view taken along line 9—9 of FIG. 8.

Referring now to FIGS. 8 and 9, a still further embodiment of the invention will be described. This embodiment includes a coupling member 101 which is identical with coupling members 15, 48 and 71 of the prior embodiments and includes an enlarged portion 102 which has axially rearward and forward spherical-shaped sides. In addition, coupling member 102 is shown attached to a pipe 103. The other coupling member is designated by the numeral 105 and includes a housing 106 shown attached to pipe 107. As indicated with the prior embodiments, pipes 103 and 107 are arranged for joining together even though the same are axially misaligned. Housing 106 is provided with an axial opening in the right end thereof, as viewed in FIG. 8, to freely receive thereinto enlarged portion for seating therein, as shown in FIG. 8. Housing 106 has formed therein an annular inwardly facing recess 109 which is shown having supported therein an annular elastomeric seal 110 which, upon application of hydraulic fluid through appropriately valved port 111, is arranged for radially inward deformation into sealing engagement between the internal surface of housing 106 and the external surface of enlarged portion 102.

The axially forward side of housing 106 also has provided therein a threaded bore terminating in a portion forming shoulder 114 and in which bore there is threadably received annular thrust ring 115. Ring 115 has provided on the forward axial side thereof at least two radially extending notches 117 adapted for engagement by a spanner wrench or the like for effecting threadable turning of ring 115 into and out of housing 106 to and from the position shown in FIG. 8.

Ring 115 is formed with a champfered or tapered surface in the form of a frusto-conical shaped cam surface 119, which surface faces generally in an axial direction away from the forward end of housing 106.

Split ring 121 is shown mounted radially adjacent to cam surface 119. Ring 121 is provided with a matching frusto-conical surface for engagement with cam surface 119. The radially inward side of split ring 121 is spherical shaped for engagement with the rearward side of enlarged portion 102, as shown. It is to be understood that split ring 121 is formed with an initial diameter larger than that of enlarged portion 102 so that enlarged portion 102 is freely received therethrough. However, split ring 121 is also dimensioned such that upon threaded rotation of thrust ring 115 into housing 106, cam surface 119 engages the external surface of ring 121 and cams the same radially inwardly and axially rearward relative to the rearward side of enlarged portion 102, thereby urging coupling members 101 and 105 axially together. During radially inward movement of split ring 21, the axially rearward side thereof contacts shoulder 114 which, in combination with the thrust applied by thrust 115, forces split ring 121 not only radially inwardly but axially forward along cam surface 119. Continued rotation of thrust ring 115, as aforesaid, causes ring 121 to ultimately engage large portion of 102 with sufficient frictional force so as to hold the same against rotation relative to coupling 106, as with the prior embodiments.

Once the tool is set, as described above, then hydraulic fluid is applied through appropriately valved port 111, thereby actuating seal 110 to the radially deformed and set position shown in FIG. 8, thereby completing the coupling operation.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. Apparatus for rigidly interconnecting the ends of two pipes comprising:
    a pair of coupling members, each of which is adapted for connection at one end thereof to the end of one of said pipes;
    one of said coupling members having attached thereto an annular radially outwardly enlarged portion having forward and rearward sides, with said forward side being generally spherical shaped;
    the other coupling member having attached thereto a housing having a seat portion adapted for receiving the forward side of said enlarged portion in generally mating engagement therewith, to thereby accommodate axial misalignment between said coupling members;
    gripping means supported generally between said housing and said enlarged portion, said gripping means being adapted for radial and axial movement relative to said housing seat portion between a retracted position in which said enlarged portion is freely mateable with said housing seat portion and an extended set position engaging the rearward side of said enlarged portion and urging said enlarged portion into positive contact with said housing seat portion and holding said enlarged portion and said housing rigidly interconnected;
    and setting means supported by said housing for urging said gripping means both radially and axially relative to said housing seat portion to said set position of engagement with said rearward side of said enlarged portion with sufficient force to hold said coupling members rigidly interconnected.

2. The invention as claimed in claim 1 wherein:
said setting means includes means for applying hydraulically actuated force to move said gripping means to said set position.

3. The invention as claimed in claim 1 including:
means for initially holding said gripping means in said radially retracted position prior to actuation thereof.

4. The invention as claimed in claim 1 wherein:
said housing has supported therein means for forming an axially and radially inwardly tapered cam surface facing said seat portion and spaced from said enlarged portion;
and said gripping means includes gripping apparatus supported generally radially inwardly of said cam surface and arranged for camming engagement therewith during movement to said set position.

5. The invention as claimed in claim 4 wherein:
said cam surface is generally frusto-conical in shape, with the small end thereof facing in the direction away from said seat portion.

6. The invention as claimed in claim 4 wherein:
the degree of taper between said cam surface and the longitudinal axis of said other coupling member is between about 30° and 60° at the minor angle.

7. The invention as claimed in claim 1 wherein:
said setting means is supported by said housing.

8. The invention as claimed in claim 7 wherein:
said setting means includes setting apparatus generally axially movable relative to said housing.

9. The invention as claimed in claim 7 wherein:
said setting means includes setting apparatus generally radially movable relative to said housing.

10. Apparatus for rigidly interconnecting the ends of two pipes, the combination comprising:
    a pair of coupling members, each of which is adapted for connection at one end thereof to the end of one of said pipes;
    one of said coupling members having attached thereto an annular radially outwardly enlarged portion having forward and rear sides, with said forward side being generally spherical shaped;
    the other coupling member having attached thereto a housing having a seat portion adapted for receiving the forward side of said enlarged portion in generally mating engagement therewith, and another portion forming an axially and radially inwardly tapered cam surface generally radially spaced from said enlarged portion, with said tapered surface facing generally toward said seat portion;
    gripping apparatus supported in said housing generally radially adjacent said tapered surface of said housing, said gripping apparatus having a gripping surface on the radially inward side for gripping engagement with the rearward side of said enlarged portion, and a tapered surface on the radially outward side for camming engagement with said cam surface, said setting apparatus being initially supported in a retracted position in which said enlarged portion is freely mateable with said housing seat portion and adapted for movement to a set position engaging said rearward side of said enlarged portion, to thereby urge said enlarged portion into positive contact with said housing seat portion;
    and setting means for applying actuation force to said gripping apparatus to thereby move said gripping apparatus along said cam surface to engagement with said rearward surface of said enlarged portion and for holding said coupling members rigidly interconnected.

11. The invention as claimed in claim 10 wherein:
said setting means includes hydraulically actuated piston means for effecting said movement of said gripping apparatus to said set position.

12. The invention as claimed in claim 11 wherein:

said piston means includes a plurality of generally axially movable pistons associated with said housing and arranged for applying a generally axial force to said gripping apparatus to thereby urge said gripping apparatus along said cam surface to said set position.

13. The invention as claimed in claim 12 including:
an elastomeric deformable annular member mounted between said pistons and said gripping apparatus for transmitting said axial force therebetween and storing energy when deformed thereby to constantly bias said gripping apparatus toward said set position.

14. The invention as claimed in claim 10 wherein:
said setting means includes a plurality of circumferentially spaced setting elements mounted in said housing and arranged for generally radial movement therein, with the radially inward ends of said elements arranged for applying forces to urge said gripping apparatus to said set position upon actuation thereof.

15. The invention as claimed in claim 14 wherein:
said setting elements are each in the form of a threaded member mounted in said housing and having the forward ends thereof in contact with a portion of said gripping apparatus, whereby turning of said threaded elements moves the same radially inward and cams said gripping apparatus to said set position.

16. The invention as claimed in claim 14 wherein:
said setting elements are each in the form of a generally radially movable piston;
and including means for applying hydraulic pressure to said pistons to urge the same radially inward to thereby cam said gripping apparatus to said set position.

17. The invention as claimed in claim 10 wherein:
the degree of taper of said cam surface relative to the longitudinal axis of said other coupling member is between about 30° and 60° at the minor angle.

18. The invention as claimed in claim 1 including:
seal means interposed between said housing and said enlarged portion for effecting a fluid seal therebetween.

19. The invention as claimed in claim 13 wherein:
said elastomeric deformable annular member is sized and adapted for effecting a fluid seal between said housing and said enlarged portion.

* * * * *